United States Patent
Cook et al.

(10) Patent No.: US 7,840,959 B2
(45) Date of Patent: Nov. 23, 2010

(54) ANALYZING RELATIONSHIPS BETWEEN AUTHORIZATION AND INSTALLATION INFORMATION FOR A SOFTWARE PRODUCT

(75) Inventors: Richard W. Cook, Tucson, AZ (US); Yura Wang, Los Altos, CA (US); Jennifer Possin, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 367 days.

(21) Appl. No.: 11/828,825

(22) Filed: Jul. 26, 2007

(65) Prior Publication Data

US 2008/0046308 A1 Feb. 21, 2008

Related U.S. Application Data

(63) Continuation-in-part of application No. 11/476,990, filed on Jun. 27, 2006.

(51) Int. Cl.
*G06F 9/445* (2006.01)
(52) U.S. Cl. .......................................... 717/174; 705/59
(58) Field of Classification Search ................. 717/174; 705/59
See application file for complete search history.

(56) References Cited

U.S. PATENT DOCUMENTS 5,398,285 A    3/1995   Borgelt
6,169,976 B1   1/2001   Colosso
6,442,559 B1   8/2002   Martinsen
6,578,199 B1 * 6/2003   Tsou et al. ................... 717/178
2001/0007100 A1 * 7/2001  Revashetti et al. ............ 705/26
2003/0004889 A1   1/2003  Fiala
2003/0177076 A1 * 9/2003  Might et al. .................. 705/28
2004/0044901 A1   3/2004  Serkowski
2006/0259976 A1 * 11/2006 Thompson et al. ............ 726/26

FOREIGN PATENT DOCUMENTS

EP   1748375 A1   7/2006
EP   1705610 A1   9/2006
GB   2439626 A    5/2007

* cited by examiner

*Primary Examiner*—Wei Y Zhen
*Assistant Examiner*—Phillip H Nguyen
(74) *Attorney, Agent, or Firm*—Park, Vaughan, Fleming & Dowler LLP; Mark Spiller

(57) ABSTRACT

One embodiment of the present invention provides a system that analyzes relationships between authorization and installation information for a software product. During operation, the system receives a set of authorization information that is associated with a transaction for a software product from a point of sale system at a retail location. The system also receives installation information for the software product from a computer system. The system determines whether the authorization information and the installation information are associated by checking whether the two sets of information share a common set of identifying information. If so, the system analyzes the associated authorization information and installation information to determine a relationship between the transaction and the associated installation of the software product.

20 Claims, 7 Drawing Sheets

ANALYZING RELATIONSHIPS BETWEEN AUTHORIZATION AND INSTALLATION INFORMATION FOR A SOFTWARE PRODUCT

RELATED APPLICATION

This application is a continuation-in-part of pending application Ser. No. 11/476,990 filed on 27 Jun. 2006 by inventors Edmund Y. L. Sung, Timothy A. Rosemore, Jennifer Possin, Raymond S. Tenenbaum, and Stephen L. Molloy, entitled, "Method and Apparatus for Authorizing a Software Product to be Used on a Computer System". This application hereby claims priority under 35 U.S.C. §120 to the above-listed parent patent application.

BACKGROUND

Software vendors are very interested in gaining insight into user purchasing behavior. Knowledge of user habits and retail preferences can be used to tailor product offerings and promotions, and thereby increase sales and profits. However, software vendors often receive only limited retail purchase information for their products. Typically, such software vendors only have access to reporting information that retail partners are willing or able to provide, or can only estimate a rough number of units sold based on retailer replenishment requests.

Such retail purchase information often spans long sampling intervals, for instance on the order of a week or longer, and hence may not provide a level of detail desired by the software vendor. Moreover, the number of units sold may span a large geographic area served by a single retailer distribution center, thereby preventing the software vendor from observing specific regional trends. While some retailers track sales information and trends in finer detail, they often consider such tracking information to be a valuable commodity and charge software vendors for access to such data.

Hence, what is needed is a method that facilitates making transaction and reporting information available to software vendors without the above-described problems.

SUMMARY

One embodiment of the present invention provides a system that analyzes relationships between authorization and installation information for a software product. During operation, the system receives a set of authorization information that is associated with a transaction for a software product from a point of sale system at a retail location. The system also receives installation information for the software product from a computer system. The system determines whether the authorization information and the installation information are associated by checking whether the two sets of information share a common set of identifying information. If so, the system analyzes the associated authorization information and installation information to determine a relationship between the transaction and the associated installation of the software product.

In some embodiments of the present invention, the authorization information includes one or more of the following: a license number for the software product; an identifier for a retailer selling the software product; an identifier for a purchase location for the software product; and a time and date of purchase for the software product.

In some embodiments of the present invention, the installation information is sent from a computer system during the installation of the software product on the computer system.

In some embodiments of the present invention, the installation information includes registration information submitted by a user before, during, or after the installation of the software product.

In some embodiments of the present invention, the installation information includes one or more of the following: a license number for the software product; the time and date when the software product was installed on the computer system; the time and date when the installed product was first executed; a customer name; a business name; and an address associated with the customer name or the business name.

In some embodiments of the present invention, the common set of identifying information includes an identifier that is common to both the authorization information and the installation information, such as a license number for the software product.

In some embodiments of the present invention, the relationship between the transaction and the associated installation of the software product can include: the time elapsed between purchasing and installing the software product; and the geographic distance between the location where the software product was purchased and the location where the software product was installed.

In some embodiments of the present invention, the system aggregates a set of relationships for multiple sets of associated authorization information and installation information. The system then determines trends from this aggregated set of relationships.

In some embodiments of the present invention, the trends determined by the system from the aggregated set of relationships can include:

- seasonal, geographic, and/or product-type variations in the purchase and the installation of the software product;
- the effect of marketing efforts on the purchase and the installation of the software product;
- geographic and temporal affinity for specific types of software products and/or transactions;
- patterns in the distance traveled to purchase the software product;
- a normal distribution for the time interval between the purchase and installation of the software product, and a set of variables that can cause this time interval to change;
- patterns in the purchase and the installation of software products on a per-retailer basis;
- patterns in the purchase, the installation, and/or the return of software products; and
- patterns in attempts to install fraudulent and/or stolen copies of the software product.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Overview

Figure 1:
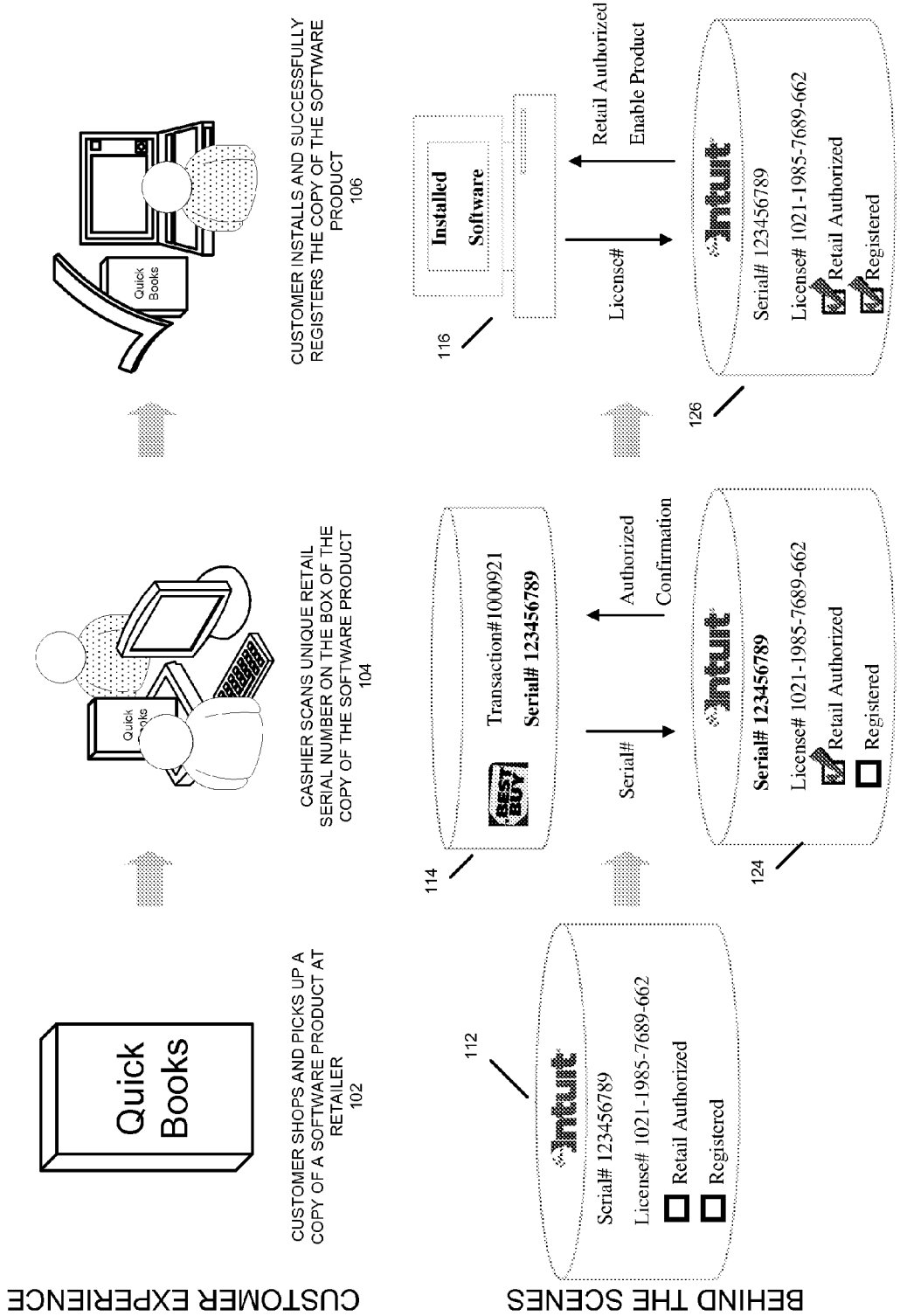
FIG. 1 illustrates the process of purchasing and installing a software product in accordance with an embodiment of the present invention.

One embodiment of the present invention teaches a method for deterring theft by authorizing the use of a software product at a point of sale system. FIG. 1 illustrates the process of purchasing and installing a software product in accordance with an embodiment of the present invention. Note that a software product can refer to a license for software already existing on a computer system, or a license and a disk to be installed on a computer system. In this embodiment, a customer selects a software product to purchase at a retailer, and takes the software product to a cashier to complete the purchase (step 102). Note that the customer can purchase a single license, a volume license, a consumptive or transaction-based license, or a site license for the software product. Furthermore, note that a customer can be an individual, or an organization. At this point, an authorization agent has neither authorized nor registered the copy of the software product (see 112). Note that an authorization agent can include a retail-store manager or owner, the original equipment manufacturer of the software product, or a third-party organization responsible for authorizing the software product. Furthermore, the authorization agent can be an individual or group of individuals, or a mechanism responsible for authorizing the software product.

In one embodiment of the present invention, the authorization agent ensures that a customer can only use a copy of the software product that the customer legally purchased. In this embodiment, the authorization agent includes a database entry for each copy of the software product for sale at the retailer.

Next, the cashier scans a unique serial number on the copy of the software product at a point of sale system (step 104). Scanning the unique serial number results in the retailer sending the unique serial number to the authorization agent (see 114). Then, the authorization agent records the fact that the retailer has authorized the copy of the software product for use, and sends an authorization confirmation to the retailer (see 124). Finally, the customer installs the copy of the software product on a computer system and registers the copy of the software product with the authorization agent (step 106). Installing the copy of the software product involves the computer system sending a license number associated with the copy of the software product to the authorization agent (see 116). The authorization agent then records the fact that the copy of the software product is registered, and also enables the full purchased functionality of the copy of the software product on the computer system (see 126). Note that the customer can install the copy of the software product on a plurality of computer systems, a server, or a plurality of servers. Also, note that registering the copy of the software product can include: verifying the identity of the customer; verifying the customer's authorization to use the copy of the software product; verifying the customer's authorization to install the copy of the software product; and providing customer contact and feedback information. In one embodiment of the present invention, registering the copy of the software product and verifying the customer's authorization to install and/or use the copy of the software product are separate and independent processes. In one embodiment of the present invention, registering the copy of the software product and verifying the customer's authorization to install and/or use the copy of the software product are part of the same process.

Figure 2:
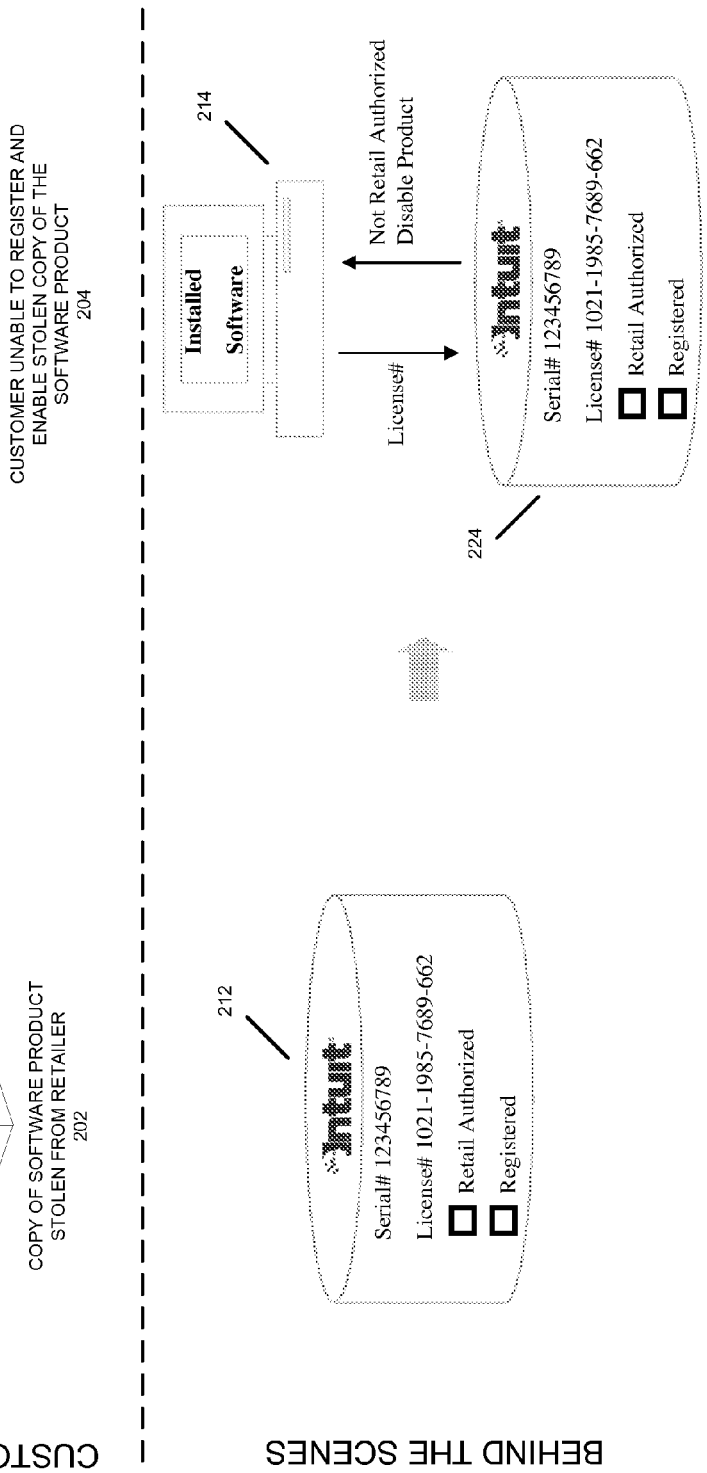
FIG. 2 illustrates the process of stealing and attempting to install a software product in accordance with an embodiment of the present invention.

FIG. 2 illustrates a process of stealing and attempting to install a software product in accordance with an embodiment of the present invention. In this embodiment, a thief steals a copy of the software product from a retailer (step 202). At this point, the authorization agent has neither authorized nor registered the copy of the software product (see 212). When the thief installs the stolen copy of the software product on a computer system, the computer system sends a license number associated with the stolen copy of the software product to the authorization agent (see 214). The authorization agent determines that the stolen copy of the software product is not authorized by the retailer and the authorization agent disables the functionality of the stolen copy of the software product on the computer system (see 224). Thus, the thief is unable to enable the functionality of the stolen copy of the software product (step 204).

Computing Environment

Figure 3:
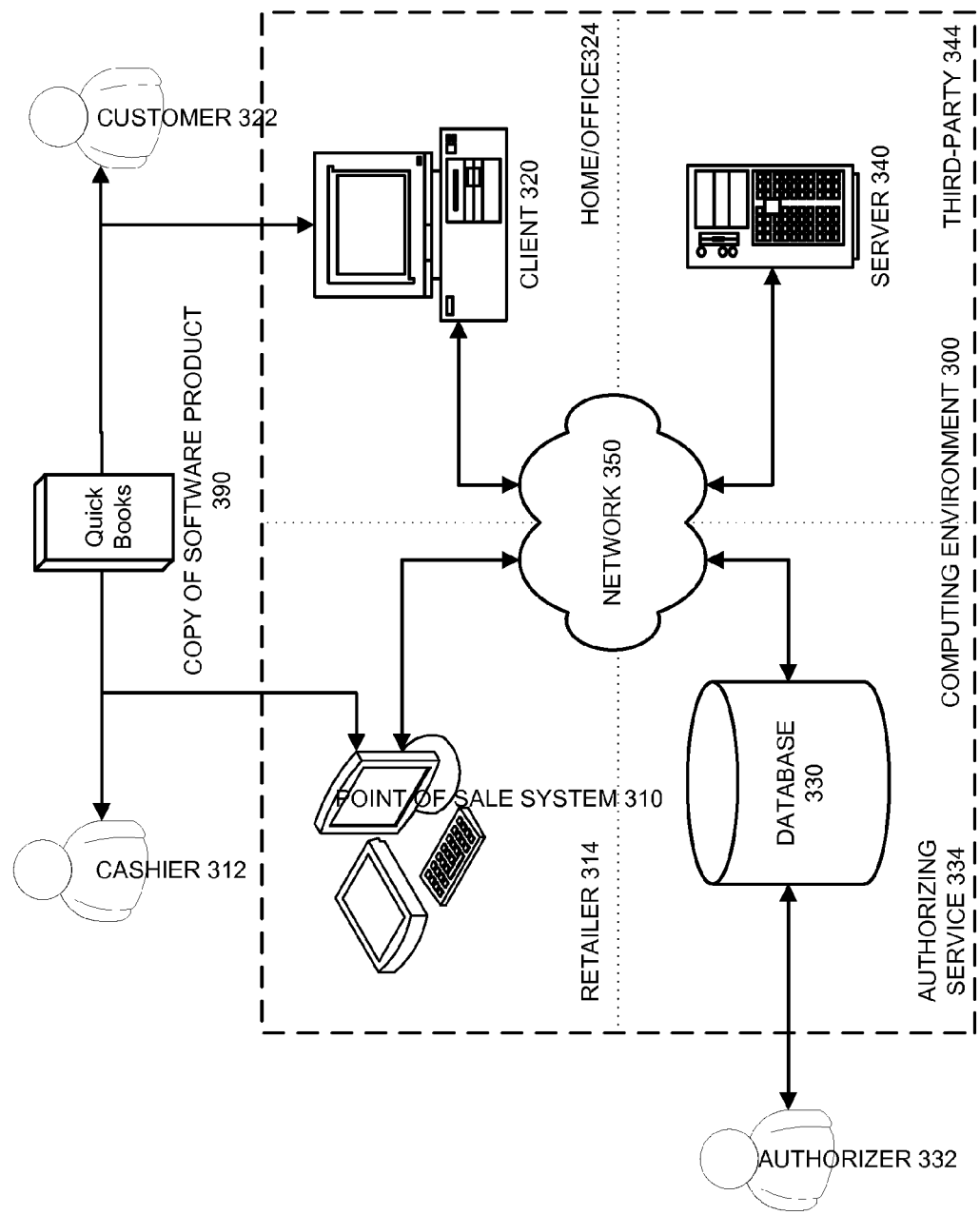
FIG. 3 illustrates a computing environment in accordance with an embodiment of the present invention.

FIG. 3 illustrates a computing environment 300 in accordance with an embodiment of the present invention. Computing environment 300 can generally include any type of computer system, including, but not limited to, a computer system based on a microprocessor, a mainframe computer, a digital signal processor, a portable computing device, a personal organizer, a device controller, and a computational engine within an appliance. Computing environment 300 includes point of sale system 310, client 320, database 330, server 340, and network 350.

In one embodiment of the present invention, computing environment 300 is divided (as illustrated by the dotted lines) into four sub-environments representing different organizations/physical locations. These sub-environments include: retailer 314 which sells the software product to customers; home/office 324 where the customer installs and uses the software product; authorizing service 334, which ensures that the copy of the software product was legally purchased prior to enabling full functionality of the software product; and third-party 344, which may perform data collection and processing to assist authorizing service 334, retailer 314, or the manufacturer of copy of software product 390.

In one embodiment of the present invention, authorizing service 334 can be the original equipment manufacturer of the copy of software product 390, or retailer 314.

In one embodiment of the present invention, home/office 324 is retailer 314.

In one embodiment of the present invention, retailer 314 is the original equipment manufacturer of the copy of software product 390.

In one embodiment of the present invention third-party 344 can be the original equipment manufacturer of the copy of software product 390, retailer 314, or authorizing service 334.

In one embodiment of the present invention, retailer 314 can be an online retailer. In this embodiment, customer 322 can download copy of software product 390 or a license for the copy of software product 390 from retailer 314's web-site or an associated web-site, or visit a brick-and-mortar store associated with retailer 314 to obtain the copy of software product 390 or a license for the copy of software product 390.

Point of sale system 310 can generally include any device capable of making and recording a purchase transaction. Typically, point of sale system 310 includes a device for scanning barcodes and a device for reading magnetic stripes, such as those found on credit cards. Point of sale system 310 can also include a device for reading radio frequency identification (RFID) tags.

Client 320 can generally include any node on a network including computational capability and including a mechanism for communicating across the network.

Database 330 can generally include any type of system for storing data. This includes, but is not limited to, systems based upon magnetic, optical, and magneto-optical storage devices, storage devices based on flash memory and/or battery-backed up memory, or other systems capable of storing computer readable data now know or later developed.

Server 340 can generally include any computational node including a mechanism for servicing requests from a client for computational and/or data storage resources.

Network 350 can generally include any type of wired or wireless communication channel capable of coupling together computing nodes. This includes, but is not limited to, a local area network, a wide area network, or a combination of networks. In one embodiment of the present invention, network 350 includes the Internet.

In one embodiment of the present invention, customer 322 decides to purchase copy of software product 390. Customer 322 takes a copy of software product 390 to cashier 312 who subsequently scans a barcode associated with the copy of software product 390 at point of sale system 310. Next, point of sale system 310 sends authorization information to database 330 via network 350 at authorizing service 334. Then, database 330 locates the database entry associated with the copy of software product 390 and records that copy of software product 390 is retail-authorized. Next, customer 322 installs the copy of software product 390 on client 320 at home/office 324. This involves client 320 contacting database 330 via network 350 and sending registration information to database 330. Database 330 uses the registration information to identify the database entry associated with the copy of software product 390 and then registers the copy of software product 390. Database 330 then enables the full functionality of the copy of software product 390 at client 320.

In one embodiment of the present invention, the authorization information can include information obtained by scanning a barcode on the box of the copy of software product 390 such as a unique serial number associated with the copy of software product 390, and a version identifier that identifies the version of computer software that customer 322 is purchasing. In addition to the information obtained by scanning the barcode on the box of the copy of software product 390, the authorization information can include: retailer 314's name; retailer 314's location identifier; the sale price, wherein the sale price is the price paid by customer 322 the for copy of software product 390; the purchase price, wherein the purchase price is the price retailer 314 paid for the copy of software product 390; customer 322's name; and customer 322's contact information.

In one embodiment of the present invention, registration information can include a serial number, a license number, retailer 314's name, customer 322's name, and customer 322's contact information.

In one embodiment of the present invention, verification information can include a serial number, a license number, retailer 314's name, customer 322's name, and customer 322's contact information.

In one embodiment of the present invention, point of sale system 310 sends the authorization information to server 340 via network 350 to perform any additional processing, such as information tracking, requested by the original equipment manufacturer (not shown), retailer 314, or authorizing service 334. The additional processing can include generating a bill for the difference between the initial purchase price (the price retailer 314 paid to obtain the copy of software product 390) and the actual purchase price (the price retailer 314 agreed to pay for the copy of software product 390). Note that the initial purchase price can be zero.

In one embodiment of the present invention, server 340 belonging to third-party 344 sends the authorization information to database 330 at authorizing service 334.

In one embodiment of the present invention, cashier 312 contacts authorizer 332 via network 350, a telephone (not shown), or any other communication method known to those familiar in the art capable of providing the authorization information to authorizer 332. Authorizer 332 then modifies an entry associated with copy of software product 390 to indicate that copy of software product 390 is retail-authorized. Note that authorizer 332 can include: a computer system that is coupled to database 330, a module within database 330, a person that has access to database 330, or a device that has access to database 330.

In one embodiment of the present invention, customer 322 contacts authorizer 332 via network 350, a telephone (not shown), or any other communication method known to those familiar in the art and provides the registration information to authorizer 332. Authorizer 332 uses the registration information to identify the database entry on database 330 associated with the copy of software product 390 and then registers the copy of software product 390. Authorizer 332 then enables the full functionality of the copy of software product 390 at client 320 by providing a license number or an authorization-key to customer 322, sending the authorization key to client 320 via a client (not shown) at authorizing service 334, or modifying an entry on database 330 associated with copy of software product 390 to indicate that copy of software product 390 is authorized for use by customer 322, client 320, or home/office 324.

In one embodiment of the present invention, retailer 314 provides the license number or authorization-key to customer 322.

In one embodiment of the present invention, copy of software product 390 is a web-based application. In this embodiment, customer 322 purchases a license from retailer 314 to download and install copy of software product 390 on client 324, or to access and use copy of software product 390 on a server, such as server 340. In this embodiment, retailer 314 can provide the license to customer 322 as a license number, an authorization-key, a dongle, a read-only storage medium, a device that can be coupled to a client that includes a license or a license certificate, or any other method for providing the license to customer 322 known to those familiar in the art.

Purchasing a Software Product

Figure 4:
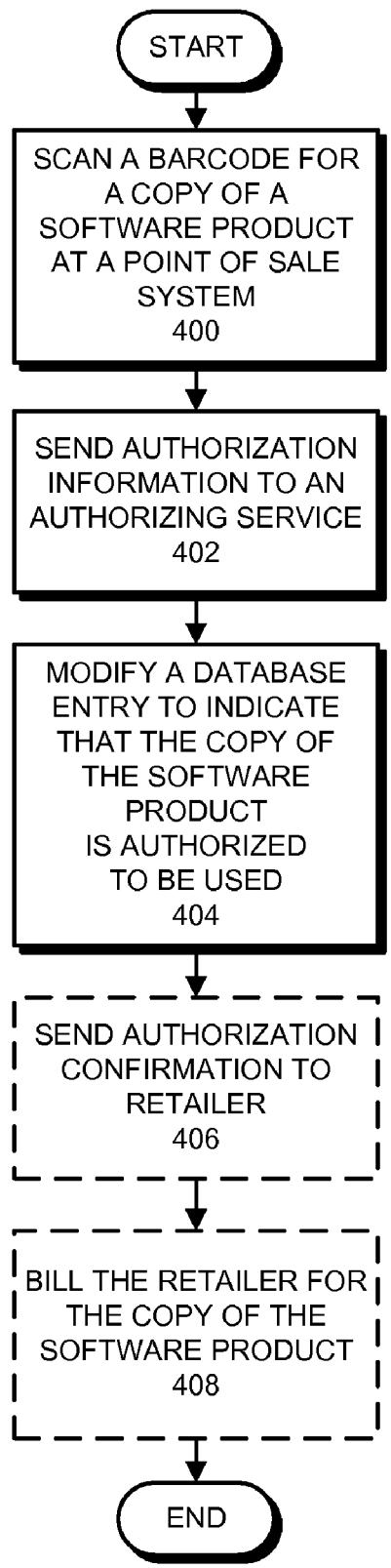
FIG. 4 presents a flowchart illustrating the process of purchasing a software product in accordance with an embodiment of the present invention.

FIG. 4 presents a flowchart illustrating the process of purchasing a software product in accordance with an embodiment of the present invention. The process begins when cashier 312 scans a barcode associated with a copy of software product 390 using point of sale system 310 (step 400). Scanning the barcode enables point of sale system 310 to obtain authorization information associated with the copy of software product 390. This authorization information can include the product name, a serial number (which is typically a unique serial number), and a version identifier which identifies the version of the copy of software product 390, wherein different versions include different levels of functionality. Point of sale system 310 can obtain additional authorization information from a computer system (not shown) associated with retailer 314 and from information that customer 322 provides to cashier 312 who subsequently provides the information to point of sale system 310 via an input device (not shown). This additional authorization information can include: retailer 314's name; retailer 314's location identifier; a copy of software product 390's sale price (the price at which retailer 322 is selling the copy of software product 390 to customer 322); a copy of computer software 390's purchase price (the price at which retailer 322 bought the copy of software product 390); customer 322's name; and customer 322's contact information. In one embodiment of the present invention, the copy of software product 390 is a complete version of a software product, but retailer 314 can sell the copy of software product 390 with different levels of functionality depending on the price customer 322 is willing to pay for a copy of software product 390. In this embodiment, authorization information can include the version of the software product that customer 322 is purchasing; or other information relevant to the purchase and licensing of a software product.

In one embodiment of the present invention, copy of software product 390 includes volume, consumptive, or site licenses.

In one embodiment of the present invention, point of sale system 310 includes an RFID reader that obtains authorization information from an RFID embedded in the copy of software product 390.

In one embodiment of the present invention, cashier 312 uses an input device such as a keyboard or a digital pen to manually enter authorization information into point of sale system 310.

Point of sale system 310 then sends the authorization information to database 330 which authorizing service 334 owns (step 402). Note that authorizing service 334 can be the original equipment manufacturer of the copy of software product 390, a third-party, or retailer 314 or an organization associated with retailer 314.

In one embodiment of the present invention, point of sale system 310 sends the authorization information to server 340 which third-party 344 owns. In this embodiment, server 340 or point of sale system 310 can send the authorization information to database 330.

Next, database 330 modifies a database entry, based on the authorization information, associated with the copy of software product 390 to indicate that the copy of software product 390 is retail authorized (step 404). Note that database 330 uses the authorization information to identify the database entry associated with the copy of software product 390.

In one embodiment of the present invention, database 330 sends an authorization confirmation to point of sale system 310 or retailer 314 (step 406). This step is optional as illustrated by the dashed lines surrounding step 406.

In one embodiment of the present invention, database 330 bills retailer 314 for the difference in the initial price, which is the price paid by retailer 314 for the copy of software product 390 prior to customer 322 purchasing the copy of software product 390 (typically the initial price is a value below the threshold value that retailer 314 uses to determine whether to use a theft deterrent device to secure the copy of software product 390) and the final price, which is the total price retailer 314 agreed to pay to the organization that sold the copy of software product 390 to retailer 314 (step 408). Note that in the case of consignment, the initial price may be zero and the organization that sold the copy of software product 390 bills retailer 314 for the purchase price of copy of software product 390 after customer 322 has purchased copy of software product 390.

Using two price points provides incentive to retailer 314 to avoid using theft deterrent devices. By not using theft deterrent devices, retailer 314 improves customer 322's shopping experience. Furthermore, retailer 314 avoids the costs associated with theft deterrent devices such as employee time spent installing and removing theft deterrent devices. This step is optional as illustrated by the dashed lines surrounding step 408.

Installing a Software Product

Figure 5:
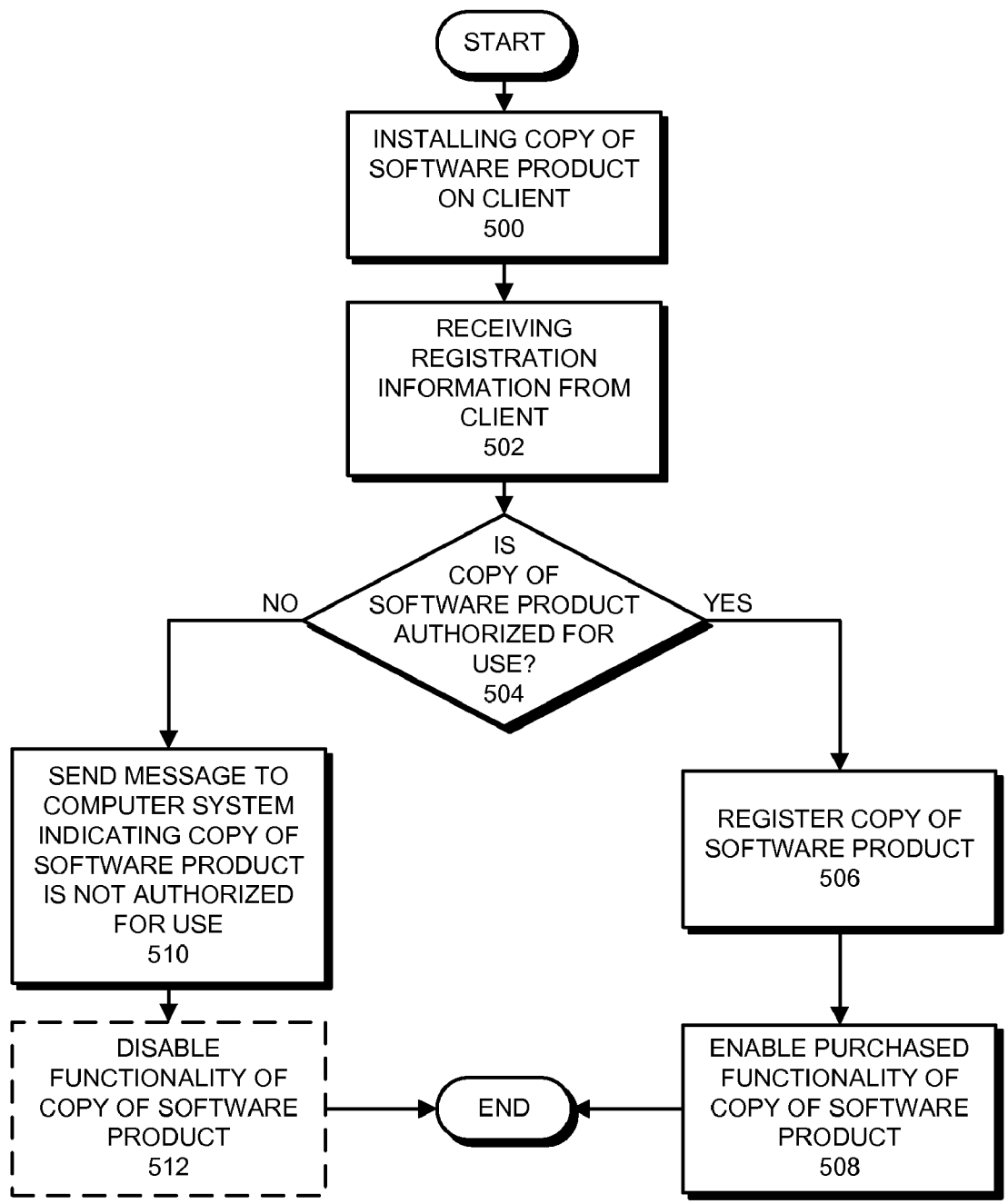
FIG. 5 presents a flowchart illustrating the process of installing a software product in accordance with an embodiment of the present invention.

FIG. 5 presents a flowchart illustrating the process of installing a software product in accordance with an embodiment of the present invention. The process begins when customer 322 installs a copy of software product 390 on client 320 (step 500). Database 330 then receives registration information from client 320 (step 502). This registration information can include a license number associated with the copy of software product 390, retailer 314's name, customer 322's name, customer 322's contact information, the name of the copy of software product 390, and the version of the copy of software product 390 that customer 322 purchased. Database 330 uses the registration information to identify the database entry associated with the copy of software product 390, and then checks if customer 322 has permission to use the copy of software product 390 (step 504). If so, database 330 registers that customer 322 owns the copy of software product 390 and has permission to use the copy of software product 390 (step 506). Database 330 then enables client 320 to execute the full functionality of the copy of software product 390 (step 508).

In one embodiment of the present invention, the process begins when customer 322 launches copy of software product 390. In this embodiment, database 330 receives verification information from client 320, which facilitates in determining if customer 322 has permission to proceed with installing, or executing copy of software product 390 on client 320. Note that "launch" can refer to launching the installation process, or launching execution of copy of software product 390.

In one embodiment of the present invention, database 330 enables client 320 to execute the purchased functionality of the copy of software product 390. Note that the purchased functionality of the copy of software product 390 may not be the full potential functionality of the copy of software product 390. This embodiment enables an organization to sell different versions of a software product on a single set of non-volatile storage media without the problem that a user who purchased a cheaper version of the software product will have access to a pricier version of the software product without paying for an upgrade.

In one embodiment of the present invention, database 330 verifies that customer 322 has permission to use the copy of software product 390 each time customer 322 attempts to use the copy of software product 390.

In one embodiment of the present invention, database 330 ensures that the number of customers using the copy of software product 390 at any given time does not exceed the number of licenses customer 322 purchased for the copy of software product 390.

In one embodiment of the present invention, database 330 ensures that customer 322 is installing the software product on a client located at a site specified by a site license.

In one embodiment of the present invention, database 330 ensures that customer 322 does not exceed the number of transactions included in a consumptive or transaction-based license.

In one embodiment of the present invention, enabling client 320 to execute the copy of software product 390 can include providing a key to unlock the copy of software product 390, decrypting the copy of software product 390, and any other method for enabling client 320 to execute the copy of software product 390 known to those familiar in the art.

If database 330 determines that customer 322 does not have permission to use the copy of software product 390, database 330 sends a message to client 320 indicating that customer 322 does not have permission to use the copy of software product 390 and that customer 322 should contact the organization that manufactures the copy of software product 390 for further assistance (step 510). Database 330 then disables the functionality of the copy of software product 390 on client 320 (step 512). This step is optional as illustrated by the dashed lines surrounding step 512.

In one embodiment of the present invention, customer 322 calls a registration agent (not shown) who works for authorizing service 334 to provide registration information to database 330. In this embodiment, the registration agent checks database 330 to determine whether customer 322 has permission to use the copy of software product 390.

In one embodiment of the present invention, database 330 receives verification information, which facilitates in determining if customer 322 has permission to install copy of software product 390 on client 320. In this embodiment, registration information determines if customer 322 has permission to use copy of software product 390, but does not prevent installation of copy of software product 390.

Deactivating a Software Product

Figure 6:
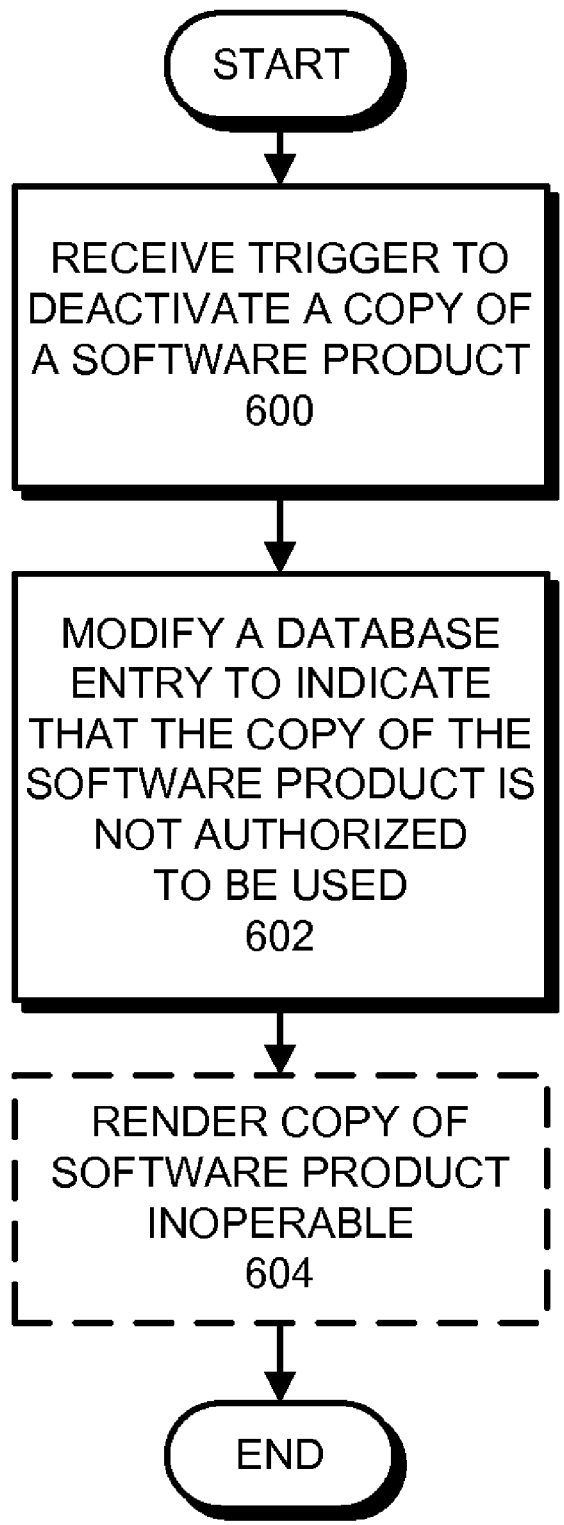
FIG. 6 presents a flowchart illustrating the process of deactivating a software product in accordance with an embodiment of the present invention.

FIG. 6 presents a flowchart illustrating the process of deactivating a software product in accordance with an embodiment of the present invention. The process begins when database 330 receives a trigger to deactivate a copy of software product 390 (step 600).

In one embodiment of the present invention, the trigger to deactivate the copy of software product 390 is an expiration time. This helps facilitate trial or grace periods of software products and for software products sold under a licensing scheme that enables the use of the software product for a limited time period. Note that a trial or grace period may or may not include the full functionality of copy of software product 390.

In one embodiment of the present invention, upon scanning the copy of software product 390, a point of sale system sends a trigger to database 330 to deactivate the copy of software product 390. This trigger includes deactivation information, which can include: a serial number associated with the copy of software product 390, retailer 314's name, retailer 314's location identifier, customer 322's name, and customer 322's contact information.

In one embodiment of the present invention, the point of sale system sending the trigger to database 330 to deactivate the copy of software product 390 is point of sale system 310.

Next, database 330 modifies a database entry associated with the copy of software product 390 to indicate that the copy of software product 390 is not authorized for use (step 602). Typically, retailers do not accept returns on opened boxes of software products for fear of contributing to copyright infringement. Using this invention, retailer 314 can accept returns, thus increasing customer satisfaction, without the fear of contributing to copyright infringement.

In one embodiment of the present invention, database 330 renders the copy of software product 390 inoperable at client 320 (step 604). This step is optional as illustrated by the dashed lines surrounding step 604.

Analyzing Relationships between Authorization and Installation Information

In one embodiment of the present invention, the system takes advantage of information from point of sale transactions to gain insight into customer behavior. In this embodiment, the retail authorization process involves additional interactions (e.g., authorization) with the software vendor that allow the software vendor to associate a specific transaction for a software product with an installation of the software product. The software vendor can then aggregate and analyze such associations to determine trends for the software product, and adjust one or more product, distribution, and/or sales parameters accordingly. For instance, trends detected from real-time retail authorization data may be used to adjust and tailor targeted marketing and retail initiatives for a software product.

As described previously, retail authorization can provide a software vendor with detailed transaction information. For instance, during a purchase transaction, the set of authorization information can include one or more of the following: a license number for the software product; an identifier for the retailer selling the software product; an identifier for a purchase location for the software product; and a time and date of purchase for the software product. Such information can be extremely useful to the software vendor, especially when linked with an additional set of information gathered during the installation of the software product.

In one embodiment of the present invention, the system receives during operation: (1) authorization information associated with a transaction for a software product from a point of sale system at a retail location; and (2) a set of installation information for the software product from a computer system. The system then determines whether an association exists between the authorization information and the installation information by searching for a common set of identifying information between the two. If an association exists, the system analyzes the two associated sets of information to determine relationships between the transaction and associated installation of the software product.

Figure 7:
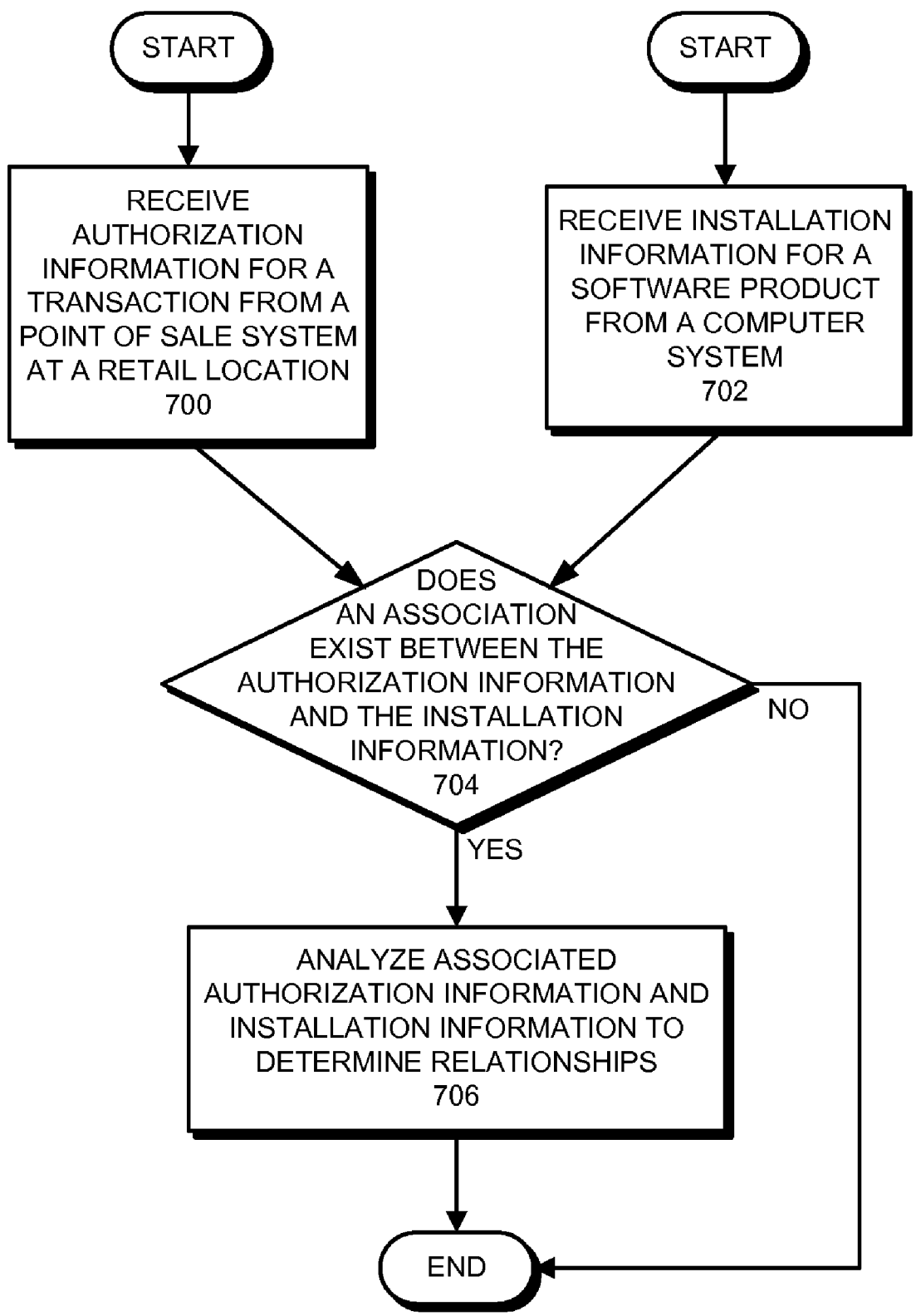
FIG. 7 presents a flowchart illustrating the process of determining an association and relationships between a set of authorization information and a set of installation information in accordance with an embodiment of the present invention.

FIG. 7 presents a flowchart illustrating the process of determining an association and a relationship between a set of authorization information and a set of installation information. During operation, the system receives authorization information associated with a transaction for a software product from a point of sale system at a retail location (operation 700) and a set of installation information for the software product from a computer system (operation 702). If an association exists between the authorization information and the installation information (operation 704), the system analyzes the associated information to determine one or more relationships between the transaction and the installation of the software product (operation 706). The system can determine an association between authorization information and installation information by searching for a common set of identifying information, such as a license number for the software product.

Note that the system may receive the authorization and installation information for a given instance of a software product independently (in different timeframes). For instance, the system may include one or more database systems that store authorization and installation information. In this scenario, the system might maintain a set of authorization information from a large number of purchases. The system can then check every received set of installation information against this set of authorization information to determine associations.

In one embodiment of the present invention, the installation information can include one or more of the following: a license number for the software product; the time and date when the software product was installed on a computer system; the time and date when the installed software product was first executed; a customer name; a business name; and an address associated with the customer name or the business name. This information, along with the available authorization information, might be used to determine additional information about the owner of a given software product, such as a business type as well as an additional set of software products and services registered to the same name or address.

Note that installation information can be gathered and/or sent from the computer system during the installation of the software product on the computer system. This installation information can also include registration information submitted by a user before, during, or after the installation of the software product. Installing the software product may also involve a verification step, during which the installed software is checked to verify that it has been activated at a point of sale system. Information relating to this verification step (such as the time of verification) may be included in the installation information received by the system.

In one embodiment of the present invention, the system analyzes associated authorization information and installation information to determine relationships between a point of sale transaction for a software product and an associated installation of the software product on a computer system. For instance, the system can determine the time elapsed between purchasing and installing the software product or the geographic distance between the location where the software product was purchased and the location where the software product was installed. Such relationships can be used to determine purchase habits and preferences for a given customer. For example, the system can determine whether a given customer typically installs new software products immediately after purchase, or delays installation for some time interval.

In one embodiment of the present invention, the system aggregates a set of relationships for multiple sets of associated authorization and installation information. The system then analyzes the aggregated data to determine trends from the set of associated transactions and installations for the software product. Detecting such trends can provide significant benefits for a software vendor, for instance by indicating one or more of the following:

seasonal, geographic, and/or product-type variations in the purchase and the installation of a software product;

the effect of marketing efforts on the purchase and the installation of a software product;

geographic and temporal affinity for specific types of software products and/or transactions;

patterns in the distance traveled to purchase a software product;

a normal distribution for the time interval between the purchase and installation of a software product, and a set of variables that can cause this time interval to change;

patterns in the purchase and the installation of software products on a per-retailer basis; and patterns in the purchase, the installation, and/or the return of software products.

Note that such trends can be tracked over short time intervals and in specific targeted geographic regions. For instance, the system can analyze the aggregated data to determine whether local media marketing efforts are effective in driving short-term purchases, or to evaluate sales in one geographic area following a day of radio, TV, or print ads. Other exemplary uses for aggregated data include: mining the aggregated data to determine whether specific software products are more attractive in some geographic area (e.g., perhaps due to a concentration of a specific small-business type in that area), and then adjusting a set of distribution parameters in response; determining patterns in how far users travel from their place of business to make a retail purchase in order to determine geographic areas in need of additional retail outlets for a software product; and using aggregated data to determine the set of different software products that are often purchased by users, businesses, or types of businesses, and then in response creating bundles of such software products to target specific market segments.

In one embodiment of the present invention, the system can also mine aggregated set of associated transaction and installation information to determine patterns in attempts to install fraudulent and/or stolen copies of a software product. The retail authorization system can be used to manage returns, de-activation, and re-activation of the software product, and hence the aggregated data can be mined to provide trend information for potentially unauthorized behavior. For instance, if the owner of a validly-authorized software product attempts to distribute additional copies along with the same license number, the system can detect the multiple attempts to install the software product with the same license number, and can deny the installation attempts and can link the copied versions to the owner of the original authorized copy. The system can also track associated authorization and installation data to flag stolen or illegitimately resold copies of the software products. Hence, instances of fraud can be tracked and handled more aggressively.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method executed by a computing device that includes a processor for analyzing relationships between purchase and installation information for a software product, comprising:

receiving, at the computing device, purchase information that is collected during a sale of the software product to a customer at a retail point-of-sale system, wherein the software product is initially un-activated, wherein the purchase information includes an identifier for the software product to confirm that the software product has been purchased, and wherein the customer does not need to be identified during the sale;

receiving, at the computing device:
installation information that is collected while the software product is installed on a customer computer that is distinct from the computing device; and
the identifier for the software product;

using the identifier to associate the purchase information with the installation information; and analyzing the purchase information and the installation information for the software product to determine a purchase and installation trend for the software product.

2. The method of claim 1, wherein the purchase information includes one or more of the following:
a license number for the software product;
a retailer identifier for a retailer selling the software product;
a location identifier for a purchase location for the software product; and
a time and date of purchase for the software product.

3. The method of claim 1, wherein the installation information is sent from the customer computer during the installation of the software product on the customer computer.

4. The method of claim 1, wherein the installation information includes registration information submitted by a user before, during, or after the installation of the software product.

5. The method of claim 1, wherein the installation information includes one or more of the following:
a license number for the software product;
a time and date at which the software product is installed;
a time and date at which the software product is executed on the customer computer;
a customer name;
a business name; and/or
an address associated with the customer name or the business name.

6. The method of claim 1,
wherein the identifier involves a set of identifying information common to both the purchase information and the installation information; and
wherein the identifier includes a license number for the software product.

7. The method of claim 1, wherein the purchase and installation trend includes one or more of the following:
a time interval between purchasing and installing the software product; and
a geographic distance between the retail point-of-sale system where the software product is purchased and a location where the software product is installed.

8. The method of claim 7, wherein the method further involves:
analyzing aggregated purchase and installation information for two or more software product purchases and installations;
determining the purchase and installation trend for multiple consumers and software products.

9. The method of claim 8, wherein analyzing aggregated purchase and installation information facilitates determining one or more of the following:
seasonal, geographic, and/or product-type variations in purchase and installation trends for the software product;
effects of marketing efforts on purchase and installation trends for the software product;
geographic and temporal affinity for specific types of software products and/or transactions;
trends in distances traveled to purchase the software product;
a normal distribution for the time interval for multiple installations of the software product, and a set of variables that can cause the time interval to change;
trends in purchase and installation actions for software products on a per-retailer basis;
trends in purchase, installation, and/or product return actions for software products; and
trends in attempts to install fraudulent and/or stolen copies of the software product.

10. A computer-readable storage medium storing instructions that when executed by a computing device cause the computing device to perform a method for analyzing relationships between purchase and installation information for a software product, the method comprising:
receiving, at the computing device, purchase information that is collected during a sale of the software product to a customer at a retail point-of-sale system, wherein the software product is initially un-activated, wherein the purchase information includes an identifier for the software product to confirm that the software product has been purchased, and wherein the customer does not need to be identified during;
receiving, at the computing device:
installation information that is collected while the software product is installed on a customer computer that is distinct from the computing device; and
the identifier for the software product;
using the identifier to associate the purchase information with the installation information; and
analyzing the purchase information and the installation information for the software product to determine a purchase and installation trend for the software product.

11. The computer-readable storage medium of claim 10, wherein the purchase information includes one or more of the following:
a license number for the software product;
a retailer identifier for a retailer selling the software product;
a location identifier for a purchase location for the software product; and
a time and date of purchase for the software product.

12. The computer-readable storage medium of claim 10, wherein the installation information is sent from the customer computer during the installation of the software product on the customer computer.

13. The computer-readable storage medium of claim 10, wherein the installation information includes registration information submitted by a user before, during, or after the installation of the software product.

14. The computer-readable storage medium of claim 10, wherein the installation information includes one or more of the following:
a license number for the software product;
a time and date at which the software product is installed;
a time and date at which the software product is executed on the customer computer;
a customer name;
a business name; and/or
an address associated with the customer name or the business name.

15. The computer-readable storage medium of claim 10,
   wherein the identifier involves a set of identifying information common to both the purchase information and the installation information; and
   wherein the identifier includes a license number for the software product.

16. The computer-readable storage medium of claim 10, wherein the purchase and installation trend includes one or more of the following:
   a time interval between purchasing and installing the software product; and
   a geographic distance between the retail point-of-sale system where the software product is purchased and a location where the software product is installed.

17. The computer-readable storage medium of claim 16, wherein the method further involves:
   analyzing aggregated purchase and installation information for two or more software product purchases and installations;
   determining the purchase and installation trend for multiple consumers and software products.

18. The computer-readable storage medium of claim 17, wherein analyzing aggregated purchase and installation information facilitates determining one or more of the following:
   seasonal, geographic, and/or product-type variations in purchase and installation trends for the software product;
   effects of marketing efforts on purchase and installation trends for the software product;
   geographic and temporal affinity for specific types of software products and/or transactions;
   trends in distances traveled to purchase the software product;
   a normal distribution for the time interval for multiple installations of the software product, and a set of variables that can cause the time interval to change;
   trends in purchase and installation actions for software products on a per-retailer basis;
   trends in purchase, installation, and/or product return actions for software products; and
   trends in attempts to install fraudulent and/or stolen copies of the software product.

19. An apparatus that analyzes relationships between purchase and installation information for a software product, comprising:
   a processor;
   a memory;
   a receiving mechanism configured to receive purchase information that is collected during a sale of the software product to a customer at a retail point-of-sale system, wherein the software product is initially un-activated, wherein the purchase information includes an identifier for the software product to confirm that the software product has been purchased, and wherein the customer does not need to be identified during the sale;
   where the receiving mechanism is further configured to receive:
      installation information that is collected while the software product is installed on a customer computer that is distinct from the apparatus; and
      the identifier for the software product;
   a determining mechanism coupled to the processor and configured to use the identifier to associate the purchase information with the installation information; and
   an analyzing mechanism coupled to the processor and configured to analyze the purchase information and the installation information for the software product to determine a purchase and installation trend for the software product.

20. The apparatus of claim 19, wherein the apparatus further comprises:
   an aggregating mechanism configured to analyze aggregated purchase and installation information for two or more software product purchases and installations; and
   wherein the determining mechanism is further configured to determine the purchase and installation trend for multiple consumers and software products.

* * * * *

UNITED STATES PATENT AND TRADEMARK OFFICE
CERTIFICATE OF CORRECTION

| | | |
|---|---|---|
| PATENT NO. | : 7,840,959 B2 | Page 1 of 1 |
| APPLICATION NO. | : 11/828825 | |
| DATED | : November 23, 2010 | |
| INVENTOR(S) | : Richard W. Cook et al. | |

It is certified that error appears in the above-identified patent and that said Letters Patent is hereby corrected as shown below:

In claim 10 (at column 14, line 27), please add the words "the sale" so that the line reads --to be identified during the sale:--

Signed and Sealed this
Eighth Day of February, 2011

David J. Kappos
*Director of the United States Patent and Trademark Office*